United States Patent [19]

Smidth

[11] Patent Number: 4,607,296
[45] Date of Patent: Aug. 19, 1986

[54] CLOCK RECOVERY SYSTEM IN DIGITAL ROTARY SCAN MAGNETIC PLAYBACK DEVICES

[75] Inventor: Peter Smidth, Mountain View, Calif.

[73] Assignee: Ampex Corporation, Redwood City, Calif.

[21] Appl. No.: 756,411

[22] Filed: Jul. 17, 1985

[51] Int. Cl.$^4$ .......................... G11B 5/09; H03D 3/24
[52] U.S. Cl. ...................................... 360/51; 375/120
[58] Field of Search ...................... 360/51, 36.2, 36.1; 375/120; 331/25

[56] References Cited

U.S. PATENT DOCUMENTS 4,191,976 3/1980 Braun ...................................... 360/51

Primary Examiner—Vincent P. Canney
Attorney, Agent, or Firm—Elizabeth E. Strnad; Joel D. Talcott

[57] ABSTRACT

An improved clock recovery system for use in digital rotary scan magnetic playback devices utilizing a phase locked loop. The clock signal recovered from the playback data has a phase error with a periodic component caused by time base variations in the playback data and a random noise component due to playback channel noise. The phase locked loop of the invention tracks the periodic component, while it suppresses the random noise component. The improved system is suitable for tracking wide bandwidth dynamic time base variations in the playback data without introducing phase errors caused by random noise into the recovered clock signal.

17 Claims, 16 Drawing Figures

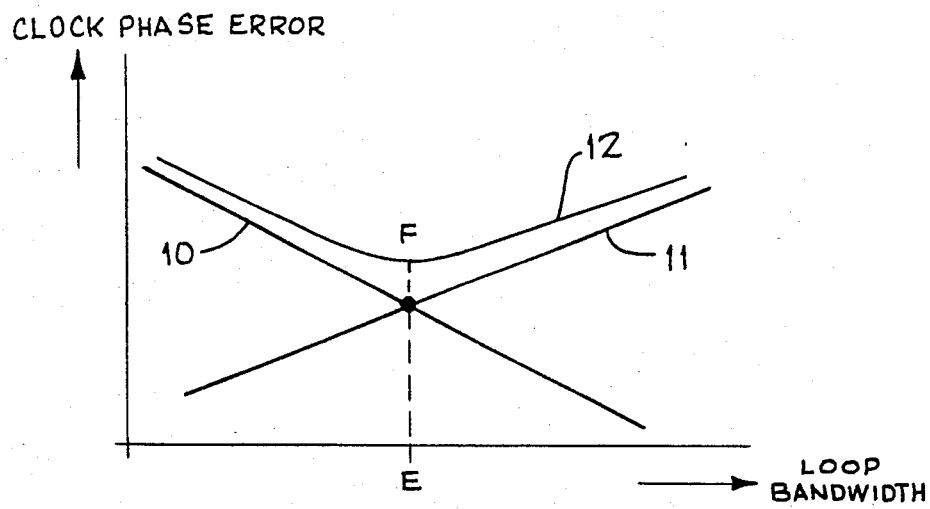
FIG_1
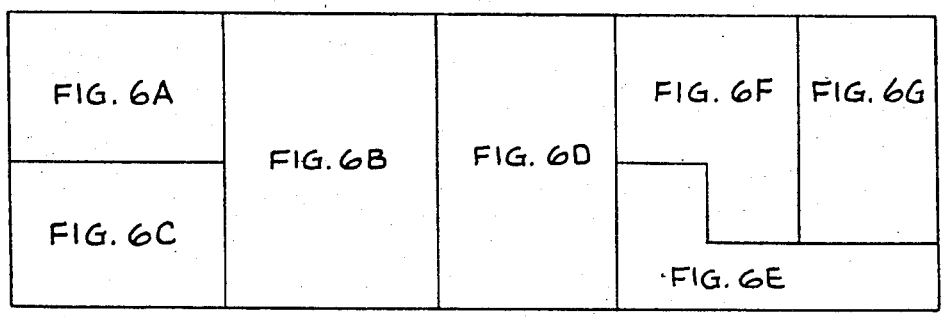
FIG_7

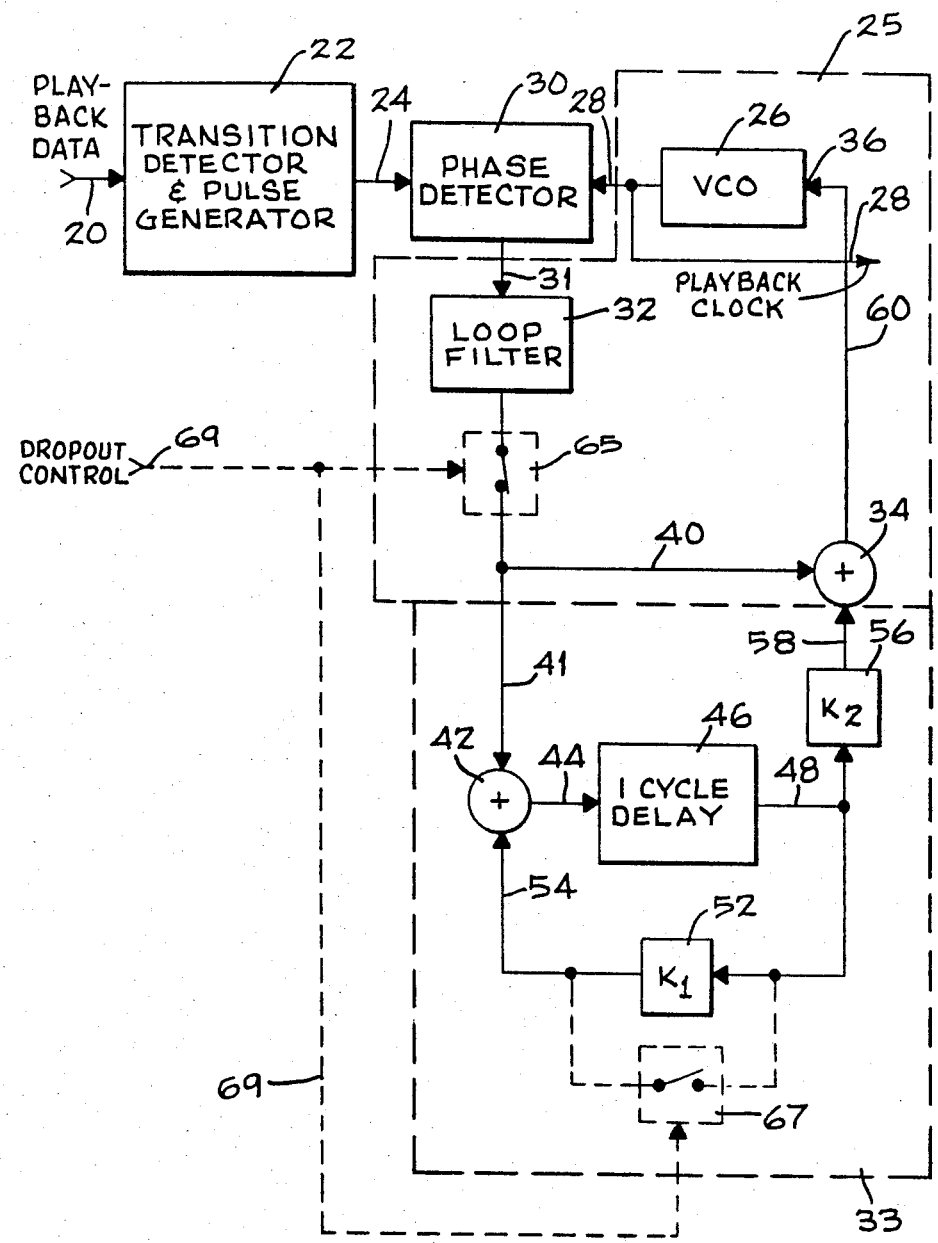
FIG_2

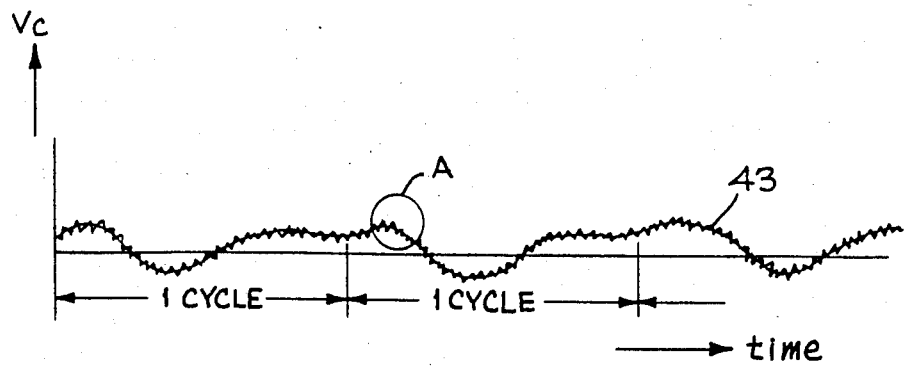
FIG_3A
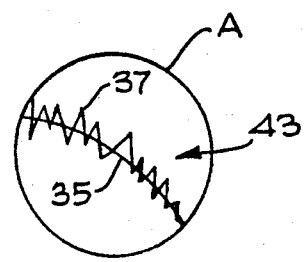
FIG_3B
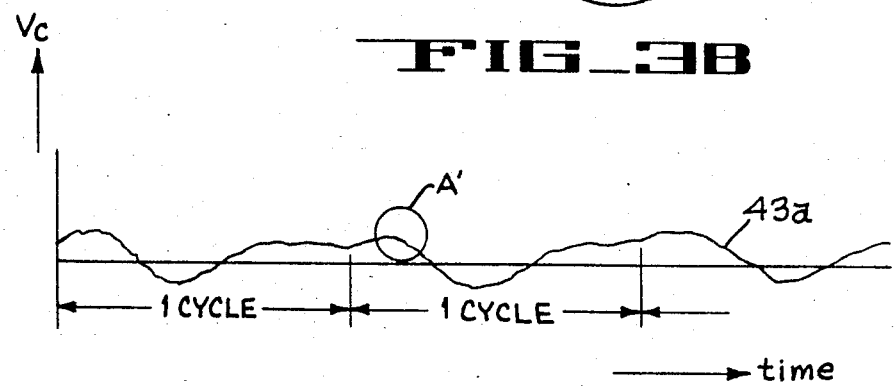
FIG_4A
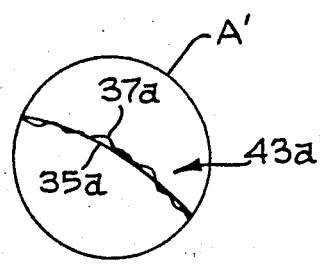
FIG_4B

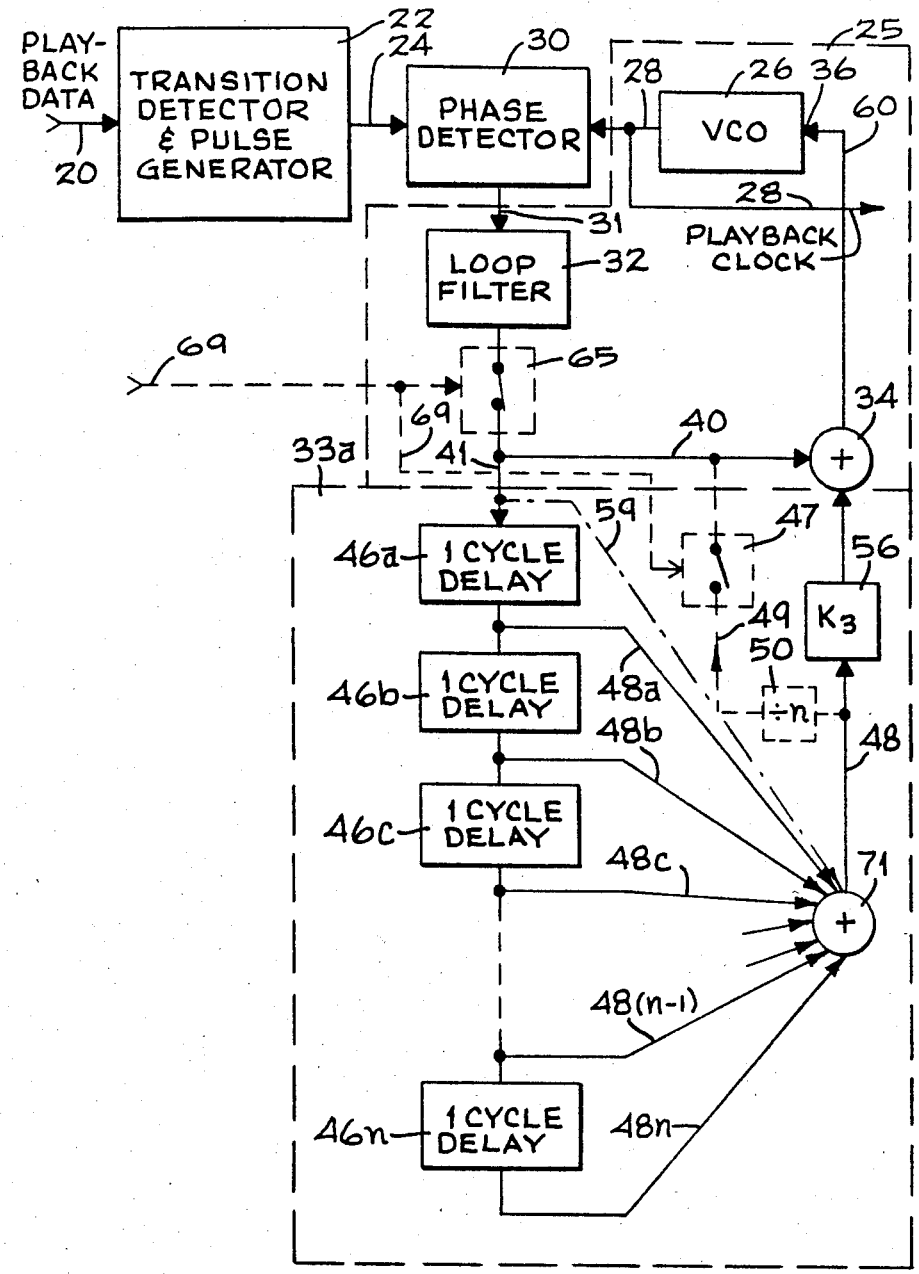
FIG_6

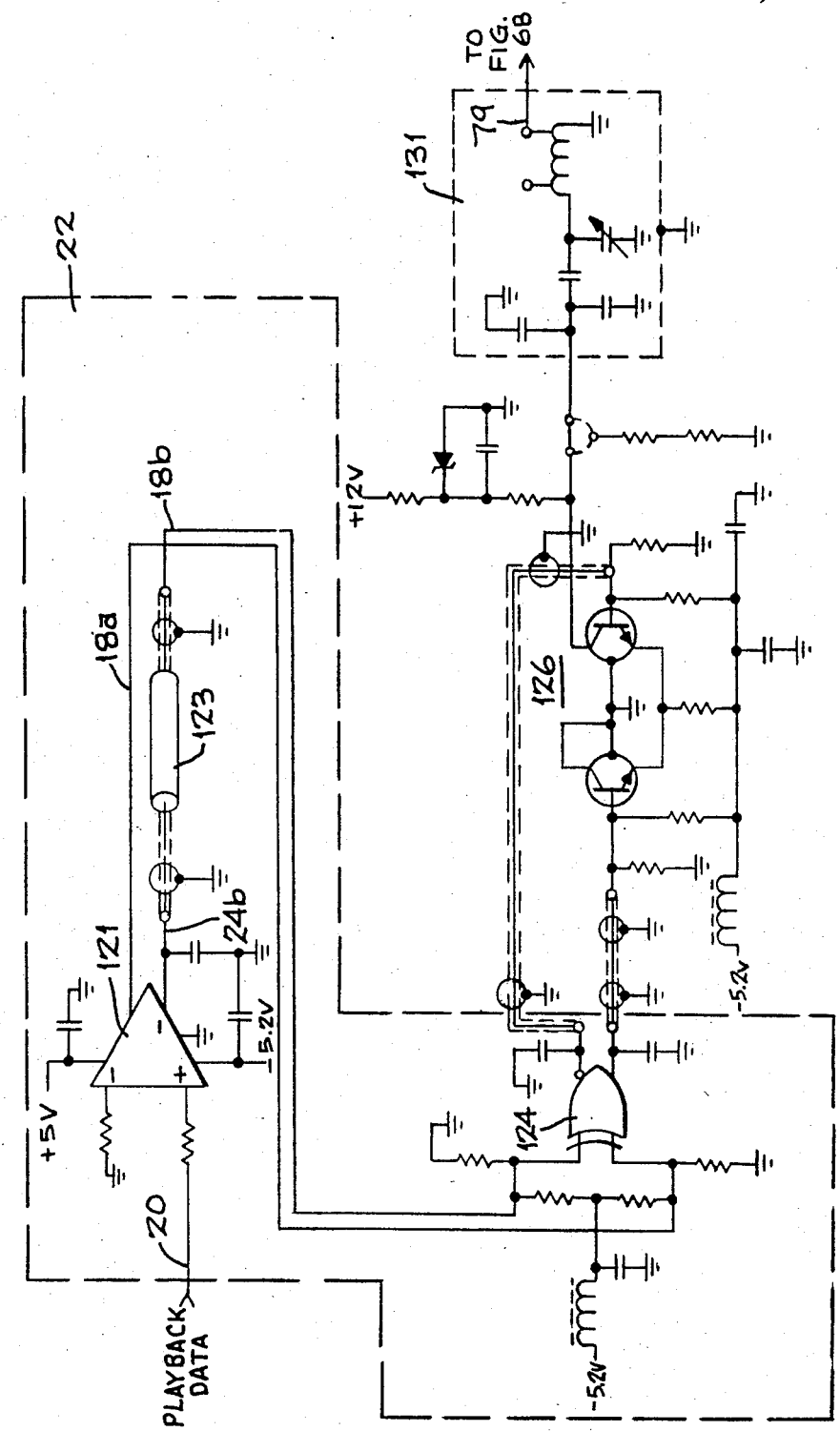

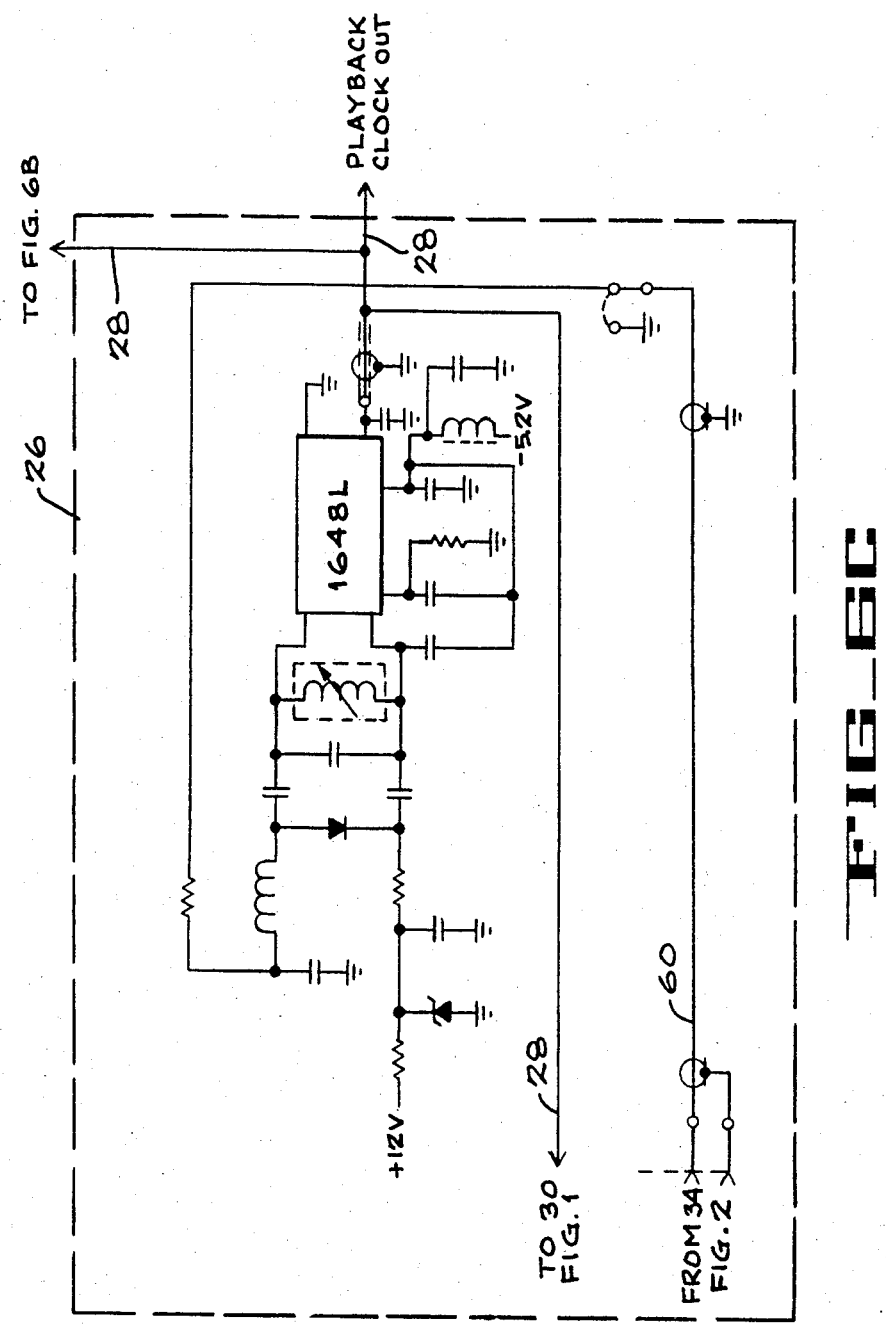
FIG._6C

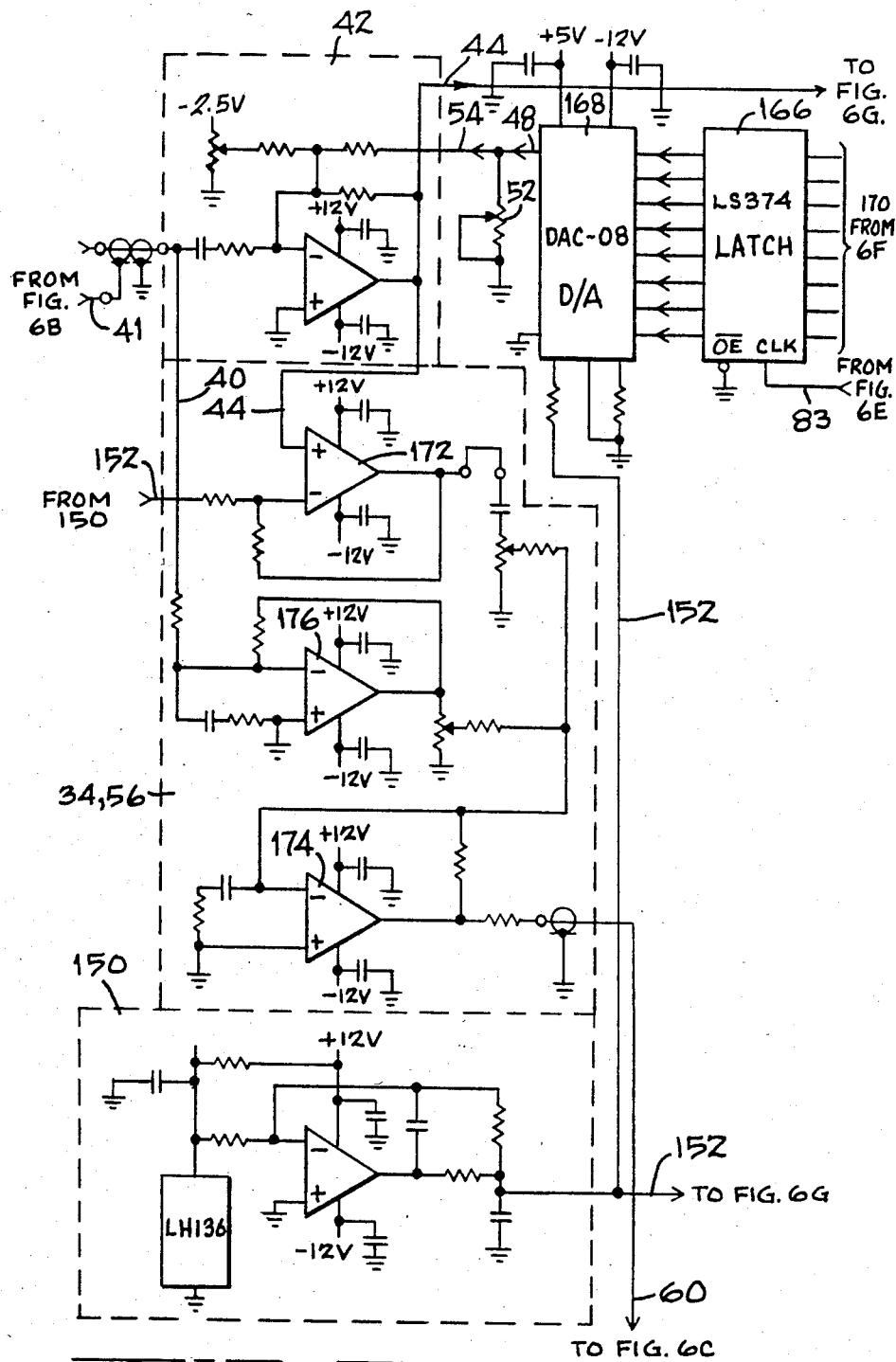
FIG_6D

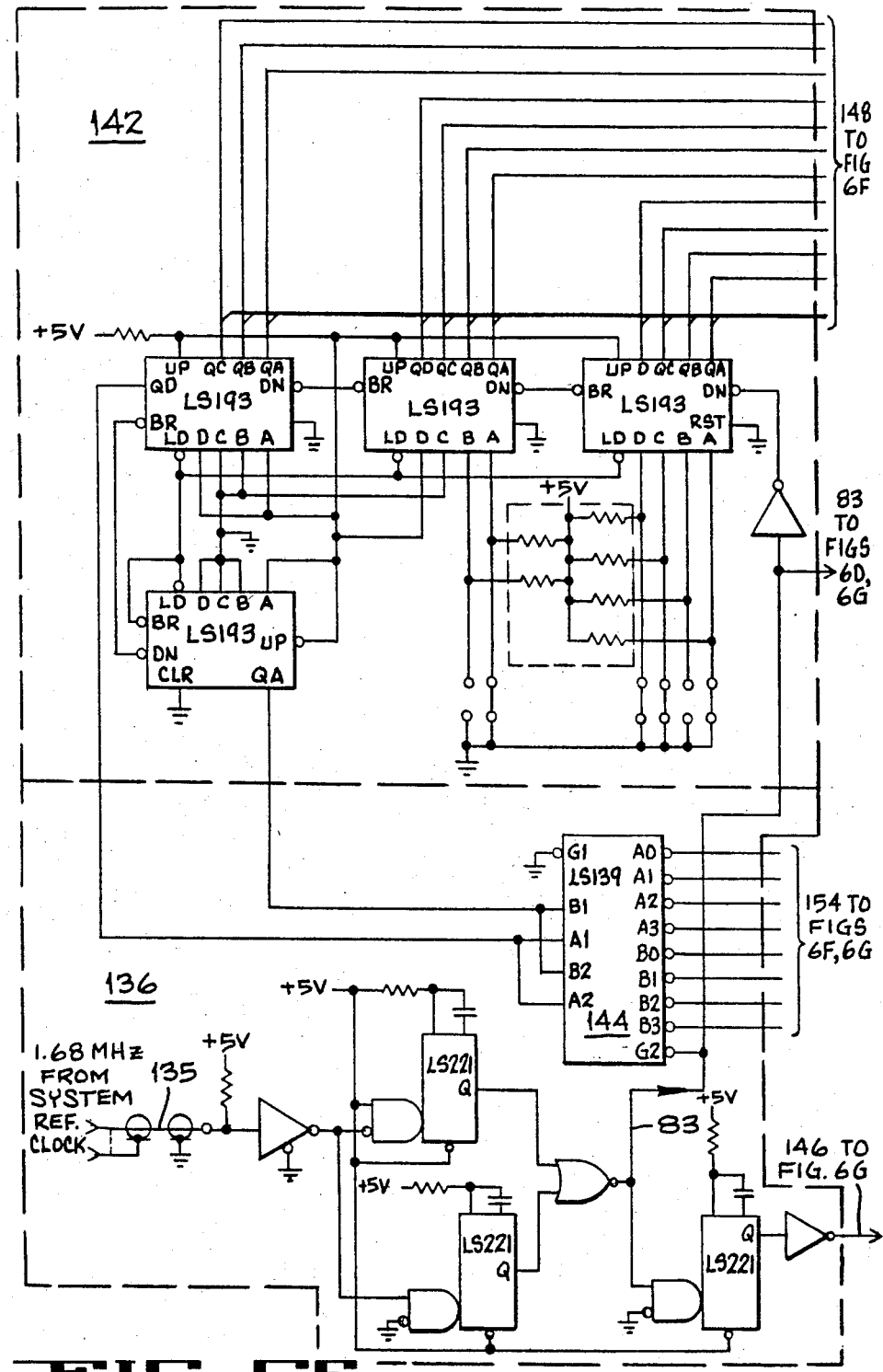
FIG_6E

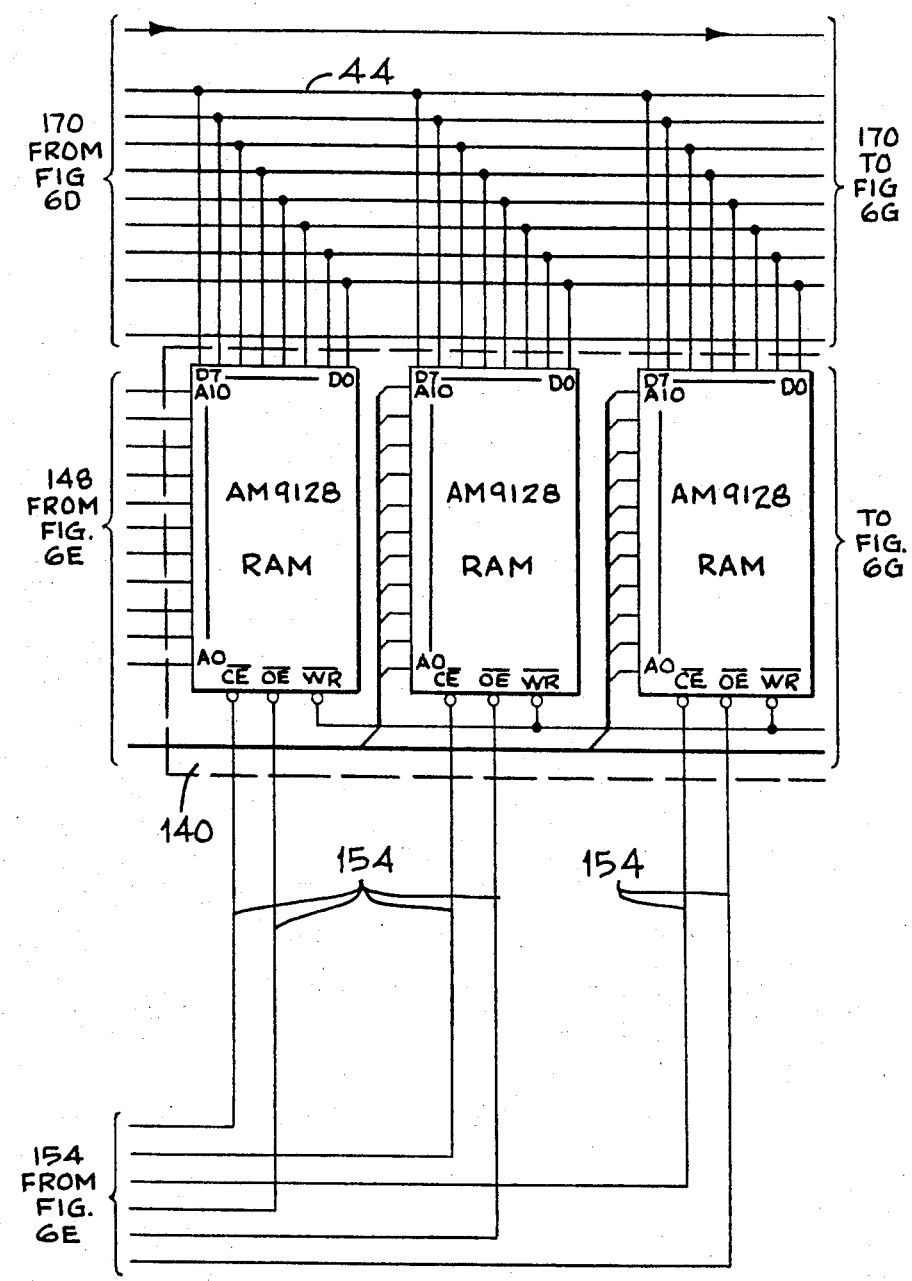
FIG_6F

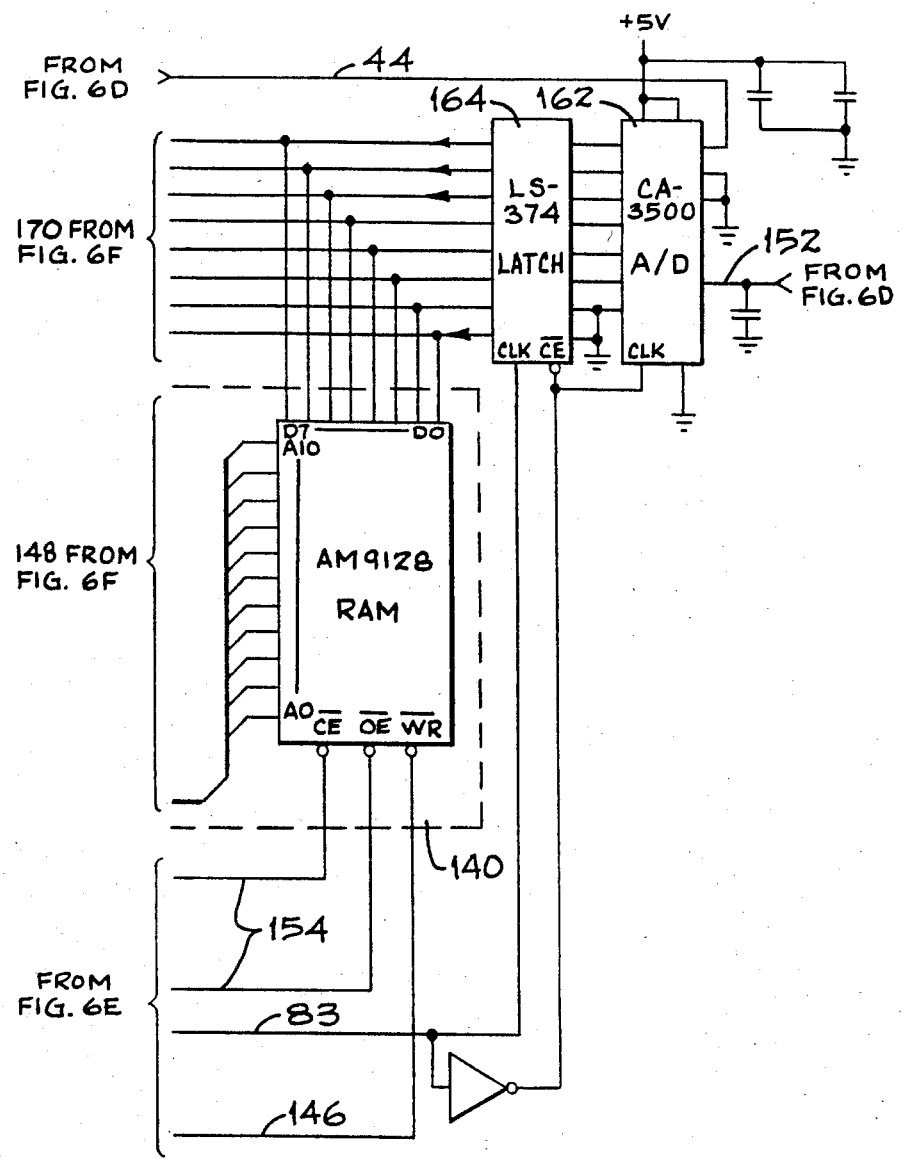
FIG_6G

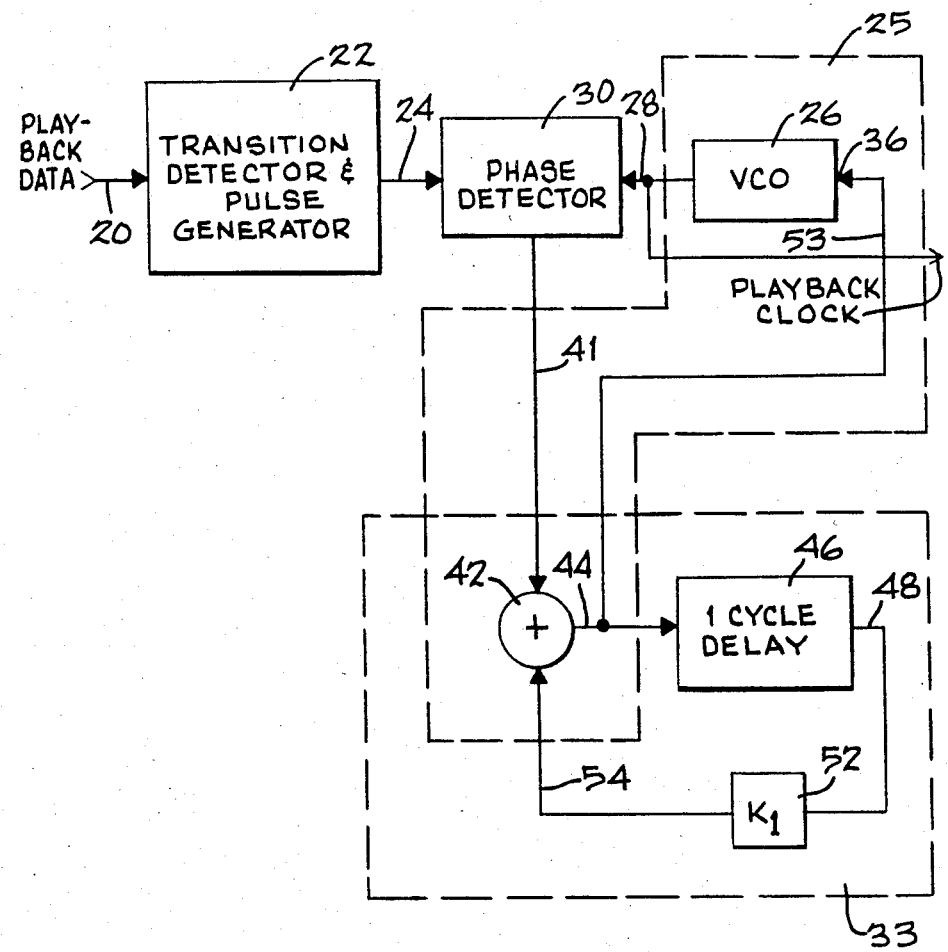
FIG_8

CLOCK RECOVERY SYSTEM IN DIGITAL ROTARY SCAN MAGNETIC PLAYBACK DEVICES

The invention described herein was made in the course of Contract No. F33657-81-C-1032 awarded by the U.S. Government.

This invention relates to an improved clock recovery system in digital rotary scan magnetic playback devices. More particularly, it is related to extending the bandwidth of a phase locked loop utilized for the clock recovery, to enable tracking frequency variations of the playback data caused by wide band dynamic time base errors while suppressing phase errors caused by random noise in the magnetic recording/reproducing channel.

Information signals subjected to magnetic recording and subsequent reproduction processes utilizing rotary scan recorders generally exhibit time base errors. One type of such errors is caused by time base variations of the reproduced signal, for example, due to mechanical instability, irregularities or dimensional changes in the magnetic medium, or to physical differences between the scanner or other tape transporting portions of the recording and reproducing device. This error has a recurring, that is periodic character and it repeats during consecutive rotations of the playback scanner.

Another type of time base errors is generated by random noise originating in the recording/reproducing channel. These errors have unpredictable instant values from scan to scan.

When reproducing a signal recorded on magnetic medium it is desired to obtain an exact replica of the originally recorded signal. For that purpose it is generally known to employ a phase locked loop comprising a voltage controlled oscillator (VCO) and a phase detector. The loop receives the playback data and it produces a clock signal which is synchronized, that is phase locked, to the playback data transitions. For example, when self-clocking digital signals are recorded and reproduced, playback data transitions are known to be phase compared by a phase detector to an output signal from a voltage controlled oscillator (VCO). The output signal from the phase detector represents a phase error signal which in turn is applied to control the frequency and phase of the output signal from the VCO. The output signal from the VCO represents a recovered clock signal synchronous with the playback data. It will be further referred to that recovered clock signal as the playback clock signal.

The phase locked loop utilized for the playback clock signal recovery must have a sufficiently wide bandwidth which is necessary to track the dynamic time base variations generated during playback. However, the playback signal generally contains random noise originating in the recording/reproducing channel. Consequently, the phase error signal has besides the previously mentioned periodic phase error component, also a random error component. By increasing the bandwidth of previously known phase locked loops, the phase error caused by random noise also increased proportionally.

FIG. 1 depicts a graph showing an example of the periodic signal component 10 and of the random noise component 11 of a phase error signal in a known phase locked loop as being dependent on the loop bandwidth. While the respective components 10, 11 are shown as being linear, alternatively they may assume non-linear shapes. The components 10, 11 are added together in the loop. A resulting clock phase error characteristic 12 is obtained as a sum of the curves 10, 11. It is seen from FIG. 1 that the resulting error characteristic increases with loop bandwidth in both directions beyond a minimum value F. Consequently, if a relatively large bandwidth is selected for the loop, phase errors caused by data noise will increase in the playback clock signal. This problem becomes even more critical in high data rate digital recorders with a relatively high head-to-tape speed where the dynamic time base variations are more extensive. In the previously known clock recovery systems an optimum bandwidth which corresponds to a minimum clock phase error has been selected, such as shown at E in FIG. 1 at the intersection of characteristics 10, 11.

It is seen from FIG. 1 that by further increasing the bandwidth of these known phase locked loops past value E the phase error component attributed to noise would increase while the periodic signal component would decrease proportionally.

Accordingly, it is a significant advantage of the clock recovery system of the present invention that a phase locked loop is provided which allows to track playback data with large bandwidth time base variations while suppressing random noise related phase errors in the recovered clock signal.

In the improved clock recovery system of the present invention a phase locked loop having a direct signal feedback path and a delayed signal feedback path is provided. The signals from both feedback paths are summed and applied to control a playback clock signal generator, for example a voltage controlled oscillator.

The direct signal feedback path is responsive to instantaneous changes in the playback data frequency and phase. This feedback path is adjusted to have a relatively low gain to obtain a desired relatively high signal-to-noise ratio, thereby suppressing any random noise present in the phase error signal provided by the loop. While the first feedback path provides instant loop response, the relatively low gain reduces its effective bandwidth and therefore, the voltage controlled oscillator is unable to track a wide range of time base variations in the playback data, as previously described.

In accordance with the teachings of the present invention, a delayed signal feedback path is provided, which increases feedback of the time base variations while it suppresses feedback of random noise level in the phase locked loop. The foregoing is obtained by summing delayed portions of the phase error signal occurring during consecutive intervals of the periodic signal component. More particularly, these signal portions are repeatedly delayed by a time period precisely equal to the time of one full rotation of the playback scanner, which time period is equal to one cycle of the periodic error signal component. The delayed signal components are summed. Because the thusly summed signal portions pertaining to the periodic error signal component are exactly in phase, their respective amplitudes add together. At the same time the amplitudes of the random noise component substantially cancel.

In the preferred embodiment only one delay circuit is utilized and the delayed signal therefrom is attenuated and fed back to the input of that delay circuit, for repeated cycling therethrough.

In an alternative embodiment a plurality of delay circuits are connected in series and the respective output signals therefrom are summed.

The foregoing and further features and advantages of the invention will become apparent from the following detailed description and accompanying drawings.

BRIEF DESCRIPTION OF THE DRAWINGS

FIG. 1 shows a graph of playback clock phase error versus loop bandwidth in a known clock recovery system.

FIG. 2 shows a block diagram of the preferred embodiment of the invention;

FIG. 3A shows an example of a phase and frequency error signal including a random noise component;

FIG. 4A shows the phase and frequency error signal of FIG. 3A with the random noise component suppressed;

FIGS. 3B and 4B show enlarged portions of the respective signals shown in FIGS. 3A and 4A;

FIG. 5 shows a block diagram of an alternative embodiment of the invention;

FIGS. 6A to 6G show consecutive portions of a detailed circuit diagram corresponding to the block diagram of FIG. 2.

FIG. 7 shows how FIGS. 6A to 6G are arranged together to form a detailed schematic diagram.

FIG. 8 shows a simplified version of the block diagram of FIG. 2.

DETAILED DESCRIPTION

Figure 6B:
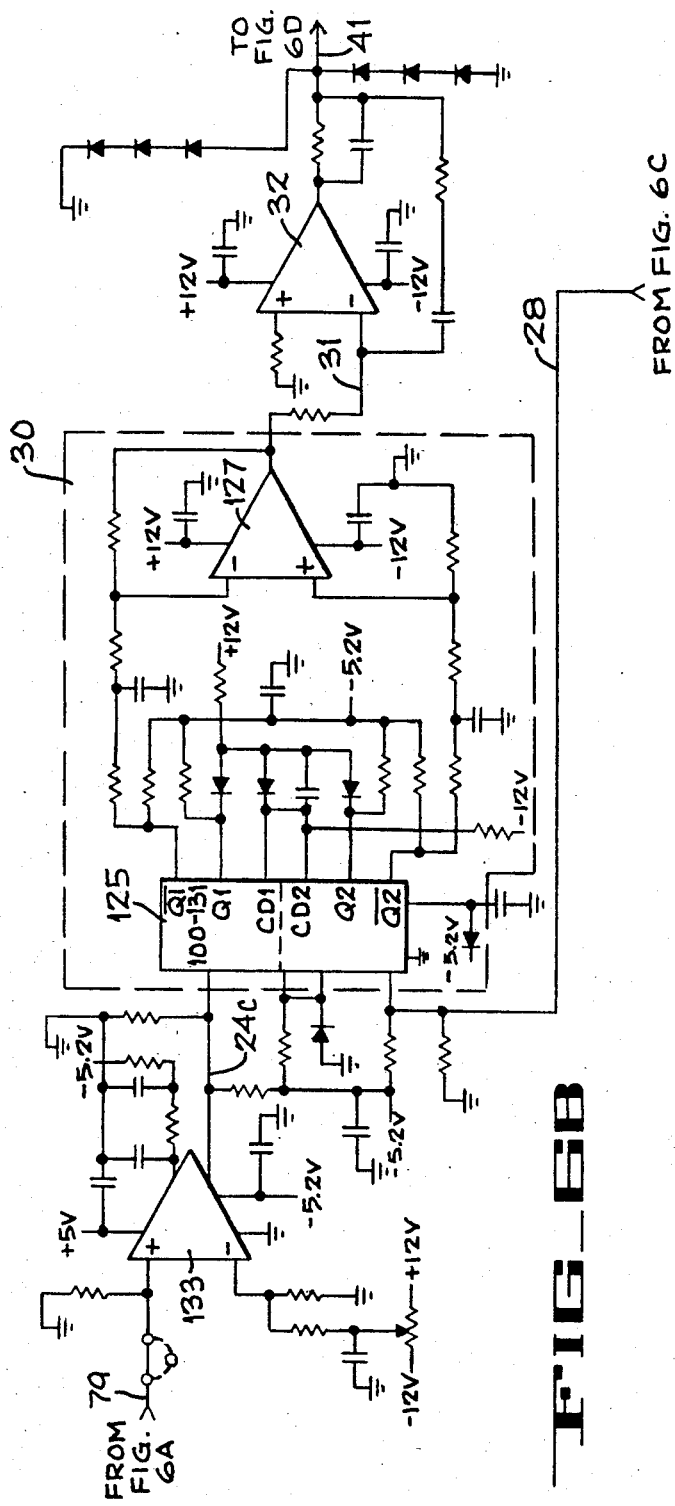

In the description below like reference numerals will be utilized to designate like circuit elements in all the drawing Figures to facilitate comparison.

FIG. 2 shows a preferred embodiment of the clock recovery system in accordance with the present invention, as it will be described below. A corresponding detailed circuit diagram shown in FIGS. 6A to 6G will be described later.

In the circuit of FIG. 2 an off tape signal containing playback data is received on input line 20. It is obtained for example by recovering a signal from a magnetic tape which has been recorded in digital form, utilizing a rotary scan helical or transverse magnetic recorder (not shown) in a manner well known in the art. For example, the recorded digital signal has been obtained by encoding an analog signal, prior to recording, utilizing Miller square code, non-return-to-zero-code or another well known code. During reproduction the recorded signal is first detected by a conventional playback head or heads mounted in a rotating scanner of the rotary scan playback device, which is similar to the device used for the recording. The signal from the playback head or heads is usually amplified by a preamplifier (not shown) and equalized, to compensate for the signal attenuation and distortion due to a non-uniform frequency response characteristic of recording and reproducing channels, as it is well known in the art.

The thusly obtained signal on line 20 is applied to a data transition detector and pulse generator circuit 22 of FIG. 2 which detects level transitions of the playback data. In response to each detected transition the circuit 22 generates a pulse on line 24. A phase detector 30 receives at its first input the output pulses on line 24 from the data transition detector and pulse generator circuit 22 and at its second input it receives an output signal on line 28 from a voltage controlled oscillator (VCO) 26. The phase detector 30 detects a phase difference between its respective input signals and it applies a resulting phase error signal on line 31.

The output signal on line 31 from the phase detector 30 is applied via a loop filter 32, line 40, and a first summing circuit 34 to a control input 36 of the VCO 26. As the loop filter 32 preferably a combined low pass filter and integrator circuit is utilized to filter the output signal from the phase detector 30 and for setting a desired optimum loop gain.

It is seen from the foregoing description that the phase detector 30, loop filter 32, summing circuit 34 and VCO 26 together represent a phase locked loop, having a direct signal feedback path 25 coupled between the output 31 and input 28 of the phase detector 30. The phase locked loop is utilized to obtain the previously mentioned playback clock signal on output line 28 from the VCO 26, which signal is synchronized to the data transitions on input line 20. Thus the output signal frequency of the VCO 26 on line 28 is controlled by the phase error signal on line 60 from summing circuit 34 to be synchronous with the data transitions of the playback signal recovered from the magnetic medium.

The gain of the above described direct signal feedback path 25 from the output of the phase detector 30 to the control input 36 of VCO 26 is preferably set low by the loop filter 32. By such low gain setting of the above-described signal path a desired relatively high signal-to-noise ratio is obtained in which the random noise error is suppressed. The thusly obtained direct signal path provides feedback for instantaneous changes in the frequency and phase of the playback data. However, by the selected low gain the effective frequency bandwidth of that signal path is also reduced in proportion. Consequently, the phase locked loop as described is unable to track large bandwidth dynamic time base variations via the first feedback path 25.

For illustration, in FIG. 3A there is shown an example of a phase and frequency error signal 43, such as obtained at the output from the loop filter 32 of FIG. 2. That signal 43 is utilized to control the VCO 26 via the feedback path 25. An enlarged portion A of the signal 43 is shown in FIG. 3B for better clarity. The signal 43 has a periodic signal component 35 which substantially repeats at intervals equal to the time of one rotation of the playback scanner. Consequently the instantaneous amplitude of component 35 is predictable. This component 35 of the phase error signal 43 is caused by time base variations of the reproduced signal, as it has been previously described.

A second, non-recurrent phase error component 37 is shown as being superimposed on the above-described periodic component 35. The component 37 is caused by noise added to the playback data during its passage through the recording and reproducing channel, as described previously. Because of its random character this noise signal has an unpredictable instantaneous amplitude. The random noise component 37 is suppressed by the circuit of the present invention as follows.

In accordance with an important feature of the present invention, a delayed signal feedback path 33 is provided in addition to the above described direct signal feedback path 25. The feedback path 33 will be described now with further reference to FIG. 2. The previously described output signal from the loop filter 32 is applied via line 41 to a second summing circuit 42 and therefrom via line 44 to a one cycle delay circuit 46, for example implemented by a delay line. Circuit 46 delays the signal on line 44 exactly by an amount of time corresponding to one full rotation of the playback scanner, which time corresponds to one cycle of the periodic signal component 35 of the previously described signal 43 shown in FIGS. 3A and 3B.

The thusly delayed signal on output line 48 from the delay circuit 46 is applied via a first attenuator 52 and line 54 to a second input of the second summing circuit 42. The delayed signal on line 48 is also applied via a second attenuator 56 to a second input of the first summing circuit 34. As it has been described above, the first input of the summing circuit 34 of FIG. 2 receives a non-delayed output signal from the loop filter 32 via line 40, of the direct feedback path. The output signal from the first summing circuit 34 is applied via line 60 to the control input 36 of the VCO 26.

The attenuated delayed signal on line 54 is summed by the second summing circuit 42 with the incoming phase error signal on line 41. The sum of the delayed and non-delayed signals on line 44 is again delayed by the delay line 46 and attenuated by attenuator 52. The resulting signal on line 54 is summed again with the incoming phase error signal on line 41 and the summed signals are delayed again by the delay line 46. It will be understood from the foregoing description that the above-described operation is repeated cyclically and that the respectively delayed and non-delayed periodic signal components are in phase at the respective inputs of the summing circuit 42.

The number of times for which each periodic signal component will cycle through the delay circuit 46 is determined by an attenuation or decay factor $K_1$ of the attenuation circuit 52. By summing the non-delayed and subsequently delayed error signal components, as previously described, portions of the error signal, which are exactly one scanner rotation apart and thus occur during subsequent cycles of the periodic error signal component, are superimposed. As it has been previously described and as follows from FIG. 3A, the superimposed portions of the periodic error signal component are in phase and thus their amplitudes are added together. However, the respective random amplitudes of the superimposed random error component substantially cancel. The larger is factor $K_1$, the more times each signal portion cycles through the delay circuit and the greater is the number of superimposed signal portions, thereby improving the noise cancellation. Therefore, it is desired to select the value $K_1$ as large as possible but less than one to avoid instability of the loop. For example, in the preferred embodiment $K_1=0.88$ is selected.

The overall gain of the output signal on line 58 from the feedback path 33 may be further adjusted by the second attenuator 56, having an attenuation factor $K_2$. The factor $K_2$ is selected less than one to partially compensate for the relatively high gain set by factor $K_1$.

The output signal on line 58 from the second attenuator 56 is summed in the summing circuit 34 with the previously described output signal on line 40 from the loop filter 32. The resulting phase error signal on line 60 is applied to control the VCO 26.

The operation of the preferred embodiment of FIG. 2 will be further explained by the following signal-to-noise calculations.

The voltage value of the periodic signal component on line 60 may be expressed as:

$$V_s = V + VK + VK^2 + VK^3 + \ldots + VK^n \quad (1)$$

where for simplicity the attenuation factors are selected $K_1=K_2=K$;

V is the non-delayed periodic signal component on line 40;

VK is the once-delayed periodic signal component on line 58;

$VK^2$ is the twice-delayed periodic signal component on line 58; etc.

After normalization by selecting $V=1$, we obtain:

$$V_s = 1 + K + K^2 + K^3 \ldots + K^n \quad (2)$$

Further solving for $V_s$:

$$V_s = \sum_{n=0}^{\infty} K^n = 1 + \sum_{n=1}^{\infty} K^n = 1 + K \sum_{n=0}^{\infty} K^n \quad (3)$$

and substituting for $$\sum_{n=0}^{\infty} K^n = V_s$$

we obtain $$V_s = 1 + KV_s \quad (4)$$

Solving for $$V_s = \frac{1}{1-K} \quad (5)$$

The random noise voltage components on line 60 may be expressed as the square root of the sum of the squares of the non-delayed and the once, twice, . . . n-times, delayed signal:

$$V_n = \sqrt{V_1^2 + (KV_2)^2 + (K^2V_3)^2 + (K^3V_4)^2 + \ldots (K^{(n-1)}V_n)^2} \quad (6)$$

After normalizing by selecting $V_1=V_2=V_3= \ldots V_n=1$ we obtain $$V_n = \sqrt{1 + K^2 + K^4 + K^6 + \ldots K^{2n}} \quad (7)$$

$$V_n^2 = 1 + K^2 + K^4 + \ldots + K^{2n} = \quad (8)$$

$$\sum_{n=0}^{\infty} K^{2n} = 1 + \sum_{n=1}^{\infty} K^{2n} = 1 + K^2 \sum_{n=0}^{\infty} K^{2n}$$

Substituting for $$\sum_{n=0}^{\infty} K^{2n} = V_n^2$$

we obtain $$V_n^2 = 1 + K^2 V_n^2 \quad (9)$$

solving for $$V_n^2 = \frac{1}{1-K^2} = \frac{1}{(1-K)(1+K)} \quad (10)$$

Consequently, the improvement in the ratio to the phase error signal components on line 60 may be expressed as:

$$\frac{V_s}{V_n} = \sqrt{\frac{V_s^2}{V_n^2}} = \sqrt{\frac{(1-K)(1+K)}{(1-K)(1-K)}} = \sqrt{\frac{1+K}{1-K}} \quad (11)$$

For example when an improvement in that ratio by a factor of 4 is desired, we may solve from equation (11) for K:

$$4 = \sqrt{\frac{1+K}{1-K}} \longrightarrow K \approx 0.88$$

FIGS. 4A and 4B show an example of a phase error signal 43a, corresponding to the above-described signal 43 of FIGS. 3A and 3B, where the random noise component 37 has been substantially reduce by the circuit of the present invention, utilizing feedback paths 25 and 33. It is seen from comparison between the signals 43 and 43a that in FIGS. 4A and 4B the random noise component 37a has been suppressed considerably, while the periodic signal component 35a has a sufficient amplitude which is necessary for the phase error tracking by the loop.

It follows from the foregoing description that the gain of the direct signal path 25 is preferably selected relatively low so as not to obtain undesirable amplification of the random noise component, while the gain of the delayed signal path 33 is preferably selected considerably higher because of the signficant noise reduction provided thereby. Consequently, the amplification of the periodic error signal component by the delayed signal feedback path allows the phase locked loop to track large dynamic time base variations of the playback signal, while the random noise is suppressed.

The circuit of the present invention may also be utilized during signal dropouts, as it will follow from further description.

When a dropout occurs in the playback signal, for example due to deposited foreign particles, surface scratches or other minute defects of the magnetic recording surface, as it is known to occur in the art of magnetic recording/reproduction, erroneous or missing signal transitions may be detected by the data transition detector and pulse generator 22. As a result, the phase detector 30 would provide an erroneous phase error signal, which, when applied to the VCO, would result in generating a clock signal having incorrect phase.

The foregoing problem is eliminated in the circuit of FIG. 2 by providing a switch 65 in the output signal path from the loop filter 32 in FIG. 2. A second switch 67, synchronous with switch 65 is also connected to bypass the attenuator 52, as shown by interrupted lines.

During normal operation switch 65 is closed and switch 67 is open. When a dropout is detected, for example by a well known conventional dropout detector (not shown), a dropout control signal is applied via line 69 to both switches 65 and 67. The control signal on line 69 causes switch 65 to open and switch 67 to close. The flow of the phase error signal on lines 40 and 41 is interrupted by switch 65, thus preventing erroneous phase correction. Instead, the last received signal portion, which has been received just before the dropout, is delayed by the one cycle delay line 46 and recycled repeatedly via switch 67 and adder 42 through the delay line 46. Bypassing attenuator 52 during dropouts by switch 67 results in recycling the delayed signal without attenuation. That is, the factor $K_1$ is set effectively to $K=1$, so that substantially no decay of the signal occurs. The thusly recycled signal is repeatedly applied via attenuator 56 and adder 34 to the control input 36 of the VCO 26, until the dropout control signal on line 69 indicates that the dropouts have terminated. At that time the control signal 69 closes switch 65, opens switch 67 and normal operation is resumed, as previously described.

FIG. 8 shows a simplified version of the above-described block diagram of FIG. 2. In FIG. 8 the loop filter 32, summing circuit 34 and the attenuator 56 are deleted from the circuit. Instead, the output signal on line 44 from the summing circuit 42 is directly applied to the control input 36 of the VCO 26. In this simplified embodiment the summing circuit 42 is a common element for both feedback paths 25 and 33. The operation of the circuit of FIG. 8 basically corresponds to that of the circuit of FIG. 2 with the attenuation factor $K_1$ selected equal to $K_2$.

FIG. 5 shows a block diagram of an alternative embodiment of the clock recovery system of the present invention, the description of which follows. Because of the similarities with the previously described circuit of FIG. 2, only the differences therefrom will be described below. In the above-described circuit of FIG. 2 one one-cycle delay line 46 has been utilized and the delayed signal has been repeatedly recycled therethrough via attenuator 52 and summing circuit 42 to obtain superimposition of subsequent one-cycle portions of the phase error correction signal as previously described. In FIG. 5 instead, a plurality of one-cycle delay lines 46a to 46n are connected in series between the output line 41 of loop filter 32 and the input line 48 of the second attenuator 56. The respective outputs 48a to 48n of all the delay lines are connected to a summing circuit 71. Each delay line 46a to 46n provides a delay exactly equal to the time of one revolution of the rotating playback scanner, containing one or more playback heads, which time corresponds to one cycle of the periodic error signal component.

Alternatively, a tapped delay line (not shown) may be provided having a plurality of taps sequentially arranged along the length thereof. The above-described delay equal to one revolution would be provided between two adjacent taps. Typically ten one scan delay lines or ten taps on a single delay line may be utilized.

As a further alternative, the respective output signals from each delay line 46a to 46n may be weighted by connecting respective attenuation circuits (not shown) in the output lines 48a to 48n, respectively. For example, gradually increasing attenuation factors may be utilized as weighting coefficients for the subsequently delayed output signals.

As a still further alternative, the non-delayed signal on line 41 may be applied via line 59 to the first summing circuit 71 directly, while the second summing circuit 34 may be deleted. Line 59 is shown in FIG. 5 by an interrupted line.

It follows from the foregoing description with reference to FIG. 5 that the operation of the alternative embodiment is similar to that previously described with respect to FIG. 2. However, while in the preferred embodiment of FIG. 2 the signal may recycle through the delay line theoretically an infinite number of times, depending on the selected decay factor, there is a finite number of recurrent delays in the circuit of FIG. 5 depending on the number of delay circuits utilized.

There is a further difference between the circuits of FIG. 2 and FIG. 5 as follows. In the circuit of FIG. 2 the signal summing or superimposition of the delayed signal portions is provided by the summing circuit 42 at the input of the delay circuit 46. However, in the circuit of FIG. 5 the summing and thereby the superimposition of the delayed signal portions is obtained by the summing circuit 71 at the output from the delay circuits 46a to 46n.

It is, however, common to both embodiments that the periodically repeating phase error signal portions are being delayed and superimposed to obtain random noise elimination, while substantially not supressing the periodic error signal component within the loop. In the embodiment of FIG. 5 a similar improvement in the ratio of the periodic and random phase error signal components $V_s/V_n$ is obtained as it has been previously described with respect to the circuit of FIG. 2.

To protect the circuit of FIG. 5 from providing erroneous phase correction due to dropouts, as it has been previously described with reference to FIG. 2, a switch 47 and a divider by n 50 are provided, in addition to the previously described switch 65. The switch 47 and divider 50 are connected in series between the lines 40 and 48, in parallel with the summing circuit 34 and attenuator 56.

When a dropout is detected, a control signal is received on line 69, as it has been described with reference to FIG. 2. The signal on line 69 opens switch 65 and closes switch 47. The flow of the phase error signal on lines 40 and 41 is thereby interrupted by switch 65, thus preventing erroneous phase correction. Instead, the last signal portion received just before the dropout, as well as the previously received signal portions which are contained in the various delay lines 46a to 46n are added by the summing circuit 71 and they are repeatedly recycled via line 48, the divider 50, line 49, switch 47 and line 40 through the delay lines 46a to 46n. The thusly recycled signal on line 40 is applied via summing circuit 34 and line 60 to the control input 36 of the VCO 26, during the occurrence of the dropout.

The divider 50 by n assures a proper amplitude without attenuation of the superimposed signal components obtained on line 48 from the summing circuit 71 for the recycling and for application as the VCO control signal.

When the dropout control signal on line 69 is removed, the switch 65 closes, the switch 47 opens and normal operation resumes.

Now the detailed circuit diagram of the preferred embodiment shown in FIGS. 6A to 6G, corresponding to the block diagram of FIG. 2, will be described. Consecutive FIGS. 6A to 6G are arranged as shown in FIG. 7 to form the detailed diagram. The previously described portion of the block diagram of FIG. 2 utilized for dropout compensation is not shown in the detailed diagram. To facilitate comparison between the Figures, portions of the detailed circuit diagram corresponding to respective blocks of FIG. 2 are enclosed by interrupted lines and designated by reference numerals corresponding to those in FIG. 2.

With further reference to FIG. 6A, there is shown a transition detector and pulse generator circuit 22, implemented by a comparator 121, fixed delay line 123, and EXOR gate 124. The comparator 121 receives an off tape signal containing playback data on line 20 and it provides on its first output line 18a a logic signal level transition for each change in the data value of the input data. On its other output line 18b the comparator 121 provides an inverted and slightly delayed output signal via the fixed delay line 123. The respective output signals are applied via lines 18a and 18b to the EXOR gate 124 which provides an output pulse for each transition of the signal received on line 20. The signal from EXOR gate 124 is applied via a logic signal level translator 126 to a resonator 131. The resonator 131 serves to remove the effect of any drop in the signal level or transition content and it provides a continuous sinewave signal. The resonator 131 is followed by a limiter 133, shown in FIG. 6B, and implemented by a comparator circuit which limits the sinewave signal amplitude in a well known manner to obtain a digital signal on line 24c at the input to a phase and frequency detector 125. The detector 125 and a following differential amplifier 127 together implement the phase detector 30 of FIG. 2.

The phase and frequency detector 125 also receives via line 28 an output signal of the VCO 26, whose detailed circuit diagram is shown in FIG. 6C. The detector 125 compares the frequency and phase of its respective input signals and it applies a high or low output signal to the respective inputs of the differential amplifier 127, depending on the result of the phase comparison. The differential amplifier 127 provides responsively on output line 31 a positive or negative signal if there is a phase difference in either sense between its input signals. However, if the input signal phases are the same, a zero signal amplitude is provided on line 31.

The loop filter 32 is shown in FIG. 6B as being implemented by an operational amplifier. The output signal from the loop filter 32 is applied via line 41 to a further operational amplifier 42 shown in FIG. 6D which corresponds to the summing circuit 42 of FIG. 2. The amplifier 42 of FIG. 6D provides a sum of the signal on line 41 and of an output signal on line 54 of the attenuator 52. The attenuator 52 of FIG. 2 is implemented in FIG. 6D by a variable resistor current sink.

FIGS. 6E to 6G show the one cycle delay line 46, which comprises four random access memories (RAM) 140, addresss counters 142 and a multiplexer 144. Because of using a digital delay line, in the preferred embodiment, the output signal on line 44 from the summing circuit 42 of FIG. 6D is first applied to an analog-to-digital (A/D) converter 162 shown in FIG. 6G. The digital output signal from the converter 162 is applied to a latch circuit 164 which provides on parallel lines of a bidirectional data bus 170 properly aligned data in time, as it is required for data input into the RAM circuit 140. The delayed parallel output data from the RAM circuit 140 is applied via the bus 170 to a latch 166 in FIG. 6D, and therefrom to a digital-to-analog (D/A) converter 168.

The output signal on line 48 from the D/A converter 168 in FIG. 6D, which corresponds to the output signal from the delay circuit 46 of FIG. 2, is applied via the attenuator 52 to the summing amplifier 42, as previously described. The signal on line 48 is also applied via a buffer amplifier 172 to an operational amplifier 174, representing the combined attenuator 56 and summing circuit 34 of FIG. 2. In the embodiment of FIG. 6D an additional operational buffer amplifier 176 is coupled into the signal path on line 40 to obtain further attenuation.

A reference voltage generator 150 shown in FIG. 6D is utilized to generate a D.C. reference voltage on line 152, which is applied to the D/A and A/D converters 168, 162 and to buffer amplifier 172, respectively.

As address counters 142 shown in FIG. 6E a cyclical counter circuit is utilized. The counter circuit 142 counts synchronously with a reference clock signal on line 135 supplied by a well known system reference clock generator (not shown). The counter 142 counts up to the number of clock cycles precisely equal to the time interval of one rotation of the playback scanner, less the respective delays provided by the A/D and D/A converter circuits 162 and 168. As previously described, the one cycle delay provided by the delay line 46 must be precisely equal to the time period of one rotation and therefore such compensation for additional circuit delays is necessary.

The data received on the bidirectional bus 170 via latch 164 is stored in respective memory locations in the RAM circuit 140 or, data is retrieved from the memory locations and applied to the bus, as indicated by the address lines 148 at the output from the address counters 142 of FIG. 6E. A particular RAM of the RAM circuit 140 is selected by the address lines 154 from the multiplexer 144 as shown in FIGS. 5E to 5G. The reference clock signal on line 135 is applied to a frequency doubler and gate circuit 136 which in turn provides properly timed write/read signals on line 146 to the RAM circuit 140.

While the invention has been particularly shown and described with reference to embodiments thereof, it will be appreciated that various alternatives and modifications may be made which fall within the scope of the appended claims.

What is claimed:

1. A clock recovery system in a digital magnetic playback device wherein a phase error signal is provided which has a periodic signal component due to time base variations of a playback signal and a random signal component due to noise, comprising:
   a phase locked loop having a controlled signal generator means for providing a playback clock signal, a phase detector means having a first input coupled to receive said playback clock signal and a second input coupled to receive an input signal indicating logic level transitions of said playback signal, said phase detector means having an output coupled to provide said phase error signal;
   a delay means coupled to receive said phase error signal and to repeatedly delay said received signal by one recurrent interval of said periodic signal component; and
   means coupled to sum said phase error signal and said repeatedly delayed signal and to apply said summed signals to a control input of said controlled signal generator means.

2. The system of claim 1 further comprising a first attenuation means coupled between an output and an input of said delay means and wherein said means for summing has a first input coupled to an output of said phase detector means, a second input coupled to receive an output signal of said first attenuation means and an output coupled to both said input of said delay means and said control input of said controlled signal generator means.

3. The system of claim 1 further comprising a first attenuation means coupled between an output and an input of said delay means and wherein said means for summing comprises a first summing means having a first input coupled to an output of said phase detector means, a second input coupled to receive an output signal of said delay means and an output coupled to said control input of said controlled signal generator means, and a second summing means having a first input coupled to receive said phase error signal provided by said phase detector means, a second input coupled to receive an output signal of said first attenuation means and an output coupled to an input of said delay means.

4. The system of claim 3 further comprising a second attenuation means coupled between said output of said delay means and said first summing means.

5. The system of claim 4 further comprising a first and a second switch means, said first switch means being coupled between said output of said phase detector means and said first and second summing means, and said second switch means being coupled in parallel with said first attenuation means, said first and second switch means having respective control inputs coupled to receive a dropout control signal for opening said first switch means and closing said second switch means in response to a dropout in said playback signal.

6. The system of claim 1 further comprising a loop filter means coupled between said output of said phase detector means and said first and second summing means.

7. The system of claim 6 wherein said loop filter means comprises a low pass filter and integrator means.

8. The system of claim 1 wherein said delay means comprises a plurality of delay circuits coupled in series, each delay circuit providing a signal delay by one said recurrent interval of said periodic error signal component, wherein said means for summing is coupled to receive and sum an output signal of said phase detector means and said respective delay circuits and to apply said summed signals to said control input of said controlled signal generator means.

9. The system of claim 1 wherein said delay means comprises a plurality of delay circuits coupled in series, each delay circuit providing a signal delay by one said recurrent interval of said periodic error signal component, wherein said means for summing comprises a first summing means coupled to receive and sum an output signal of said respective delay circuits and a second summing means coupled to receive an output signal of said first summing means and an output signal of said phase detector means and to apply said summed signals to said control input of said controlled signal generator means.

10. The system of claim 9 further comprising an attenuation means coupled between said first and said second summing means.

11. The system of claim 10 further comprising a first switch means coupled between an output of said phase detector means and an input of a first one of said plurality of delay circuits, and a series combination of a second switch means with a divider means coupled between said input of said first delay means and said output of said first summing means, said divider means being coupled to divide an output signal of said first summing means by an integral number equal to a number of said plurality of delay circuits, said first and second switch means having a control input coupled to receive a dropout control signal for opening said first switch means and closing said second switch means in response to a dropout in said playback signal.

12. A clock recovery system in a digital rotary scan magnetic playback device wherein a phase error signal is provided which has a periodic signal component due to time base variations of a playback signal and a random signal component due to noise, comprising:

a controlled playback clock signal generator means;

a phase detector means having a first input coupled to receive a playback clock signal from said signal generator means and a second input coupled to receive an input signal indicating logic level transitions of said playback signal, said phase detector means coupled to provide said phase error signal;

a delay means coupled to receive said phase error signal and to repeatedly delay said received signal by one recurrent interval of said periodic signal component;

an attenuation means coupled between an output and an input of said delay means; and means for summing said attenuated delayed signal and said phase error signal and to apply said summed signals to said control input of said signal generator means.

13. A clock recovery system in a digital rotary scan magnetic playback device wherein a phase error signal is provided which has a periodic signal component due to time base variations of a playback signal and a random signal component due to noise, comprising:

a controlled playback clock signal generator means;

a phase detector means having a first input coupled to receive a playback clock signal from said signal generator means and a second input coupled to receive an input signal indicating logic level transitions of said playback signal, said phase detector means coupled to provide said phase error signal;

a loop filter means coupled to receive and filter said phase error signal;

a delay means coupled to receive an output signal of said loop filter means and to delay said received signal by one recurrent interval of said periodic signal component;

an attenuation means coupled between an output and an input of said delay means;

a first summing means having a first input coupled to an output of said loop filter means, a second input coupled to receive an output signal of said first attenuation means and an output coupled to said input of said delay means;

a second summing means coupled to receive said output signal of said delay means and said output signal of the loop filter means and to apply said summed signals to said control input of said signal generator means; and a second attenuation means coupled between said output of said delay means and said second summing means.

14. The system of claim 13 further comprising a first and a second switch means, said first switch means being coupled between an output of said loop filter means and said first and second summing means, and said second switch means being coupled in parallel with said first attenuation means, said first and second switch means having respective control inputs coupled to receive a dropout control signal for opening said first switch means and closing said second switch means in response to a dropout in said playback signal.

15. A clock recovery system in a digital magnetic playback device wherein a phase error signal is provided which has a periodic signal component due to time base variations of a playback signal and a random signal component due to noise, comprising:

a controlled playback clock signal generator means;

a phase detector means having a first input coupled to receive a playback clock signal from said signal generator means and a second input coupled to receive an input signal indicating logic level transitions of said playback signal, said phase detector means coupled to provide said phase error signal;

a loop filter means coupled to receive and filter said phase error signal;

a plurality of delay circuits coupled in series, each providing a signal delay by one recurrent interval of said periodic signal component, a first one of said delay circuits coupled to receive an output signal of said loop filter means; and a first summing means coupled to receive and sum an output signal of said respective delay circuits and said output signal of said loop filter means and to apply said summed signals to said control input of said playback clock signal generator means.

16. A clock recovery system in a digital rotary scan magnetic playback device wherein a phase error signal is provided which has a periodic signal component due to time base variations of a playback signal and a random signal component due to noise, comprising:

a controlled playback clock signal generator means;

a phase detector means having a first input coupled to receive a playback clock signal from said signal generator means and a second input coupled to receive an input signal indicating logic level transitions of said playback signal, said phase detector means coupled to provide said phase error signal;

a loop filter means coupled to receive and filter said phase error signal;

a plurality of delay circuits coupled in series, each providing a signal delay by one recurrent interval of said periodic signal component, a first one of said delay circuits coupled to receive an output signal of said loop filter means;

a first summing means coupled to receive and sum an output signal of said respective delay circuits;

a second summing means coupled to receive said output signal of said first summing means and an output signal of said loop filter means and to apply said summed signals to said control input of said playback clock signal generator means; and a second attenuation means coupled between said first and said second summing means.

17. The system of claim 16 further comprising a first switch means coupled between an output of said loop filter means and an input of a first one of said plurality of delay circuits, and a series combination of a second switch means with a divider means coupled between said input of said first delay means and an output of said first summing means, said divider means being coupled to divide an output signal of said first summing means by an integral number equal to a number of said plurality of delay circuits, said first and second switch means having respective control inputs coupled to receive a dropout control signal for opening said first switch means and closing said second switch means in response to a dropout in said playback signal.

* * * * *